US008697795B2

(12) United States Patent
Knoll et al.

(10) Patent No.: US 8,697,795 B2
(45) Date of Patent: Apr. 15, 2014

(54) THERMOPLASTIC LINOLEUM

(76) Inventors: Konrad Knoll, Mannheim (DE); Michel Pepers, Ludwigshafen (DE)

( * ) Notice: Subject to any disclaimer, the term of this patent is extended or adjusted under 35 U.S.C. 154(b) by 0 days.

(21) Appl. No.: 13/216,391

(22) Filed: Aug. 24, 2011

(65) Prior Publication Data

US 2012/0053284 A1  Mar. 1, 2012

Related U.S. Application Data

(60) Provisional application No. 61/376,697, filed on Aug. 25, 2010.

(51) Int. Cl.
*C08K 5/09* (2006.01)
*C09B 67/00* (2006.01)

(52) U.S. Cl.
USPC ............................. 524/502; 525/55; 525/386

(58) Field of Classification Search
USPC ................. 524/502, 300; 525/55, 384, 386; 526/319, 321
See application file for complete search history.

(56) References Cited

U.S. PATENT DOCUMENTS

| 6,197,889 B1 | 3/2001 | Knoll et al. |
| 6,680,394 B1 | 1/2004 | Brumm et al. |
| 6,987,137 B1 | 1/2006 | Sasatani |
| 2002/0032355 A1 * | 3/2002 | Franks ........................ 568/869 |
| 2008/0044661 A1 * | 2/2008 | Hazell ........................ 428/423.1 |
| 2010/0152370 A1 | 6/2010 | Steinhauser et al. |
| 2010/0261824 A1 | 10/2010 | Knoll et al. |

FOREIGN PATENT DOCUMENTS

| DE | 199 06 832 | 8/2000 |
| DE | 102008052116 A1 | 4/2010 |
| GB | 452944 | 9/1936 |
| JP | 03-241083 A | 10/1991 |
| WO | WO-97/40079 A1 | 10/1997 |
| WO | WO 2009/074645 | 6/2009 |
| WO | WO 2012/025554 | 3/2012 |

OTHER PUBLICATIONS

"Functional Group." Wikipedia [online] Retrieved online [Jan. 28, 2013], Retrieved from Internet <URL:http://www.wikipedia.org/function_group>.*
International Search Report, PCT/EP2011/064514—mailed Oct. 12, 2011.

* cited by examiner

*Primary Examiner* — Hannah Pak
(74) *Attorney, Agent, or Firm* — Novak Druce Connolly Bove + Quigg LLP

(57) ABSTRACT

The present invention relates to a thermoplastic molding composition at least comprising particles made of nonoxidatively polymerized vegetable oil which has been crosslinked by way of functional groups, as component (A), at least one thermoplastic polymer, as component (B), optionally at least one resin, as component (C), optionally at least one filler, as component (D), and optionally further additives, use thereof and a process for production thereof.

14 Claims, No Drawings

THERMOPLASTIC LINOLEUM

CROSS-REFERENCE TO RELATED APPLICATION

This application claims the benefit of U.S. Provisional Application Ser. No. 61/376,697 filed Aug. 25, 2010, the entire contents of which are incorporated herein by reference in its entirety.

FIELD OF THE INVENTION

The present invention relates to a thermoplastic molding composition at least comprising particles made of nonoxidatively polymerized vegetable oil which has been crosslinked by way of functional groups, as component (A), at least one thermoplastic polymer, as component (B), optionally at least one resin, as component (C), optionally at least one filler, as component (D), and optionally further additives, use thereof and a process for production thereof.

BACKGROUND

Linoleum is a floorcovering developed in 1863 by Frederick Walton, and mainly composed of oxidatively polymerized linseed oil, tree resins (colophonium), cork flour and wood flour, titanium oxide, dyes, and a jute textile. Advantages of linoleum are mainly the resistance to oils, fats, and tar. Linoleum is antistatic and has slightly fungicidal and bacteriostatic action with regard to various microorganisms. The cause of this effect is the ongoing emission of small amounts of various aldehydes, such as hexanal, acrolein, acetaldehyde, etc., which derive from atmospheric oxidation of linseed oil, which continues practically infinitely, or are residues from the oxidation reaction in the production process.

Examples of disadvantages of linoleum are that the typical linoleum odor has been demonstrated to be capable of triggering mucosal irritation and allergies in sensitive persons. Linoleum is moreover not very resistant to point loads, and is not suitable for use in wetrooms. Linoleum is moreover very easily damaged by alkalis and is chemically degraded by these.

Because petroleum reserves are becoming ever smaller, there is a constant demand for materials that can be obtained from naturally renewable resources. The mechanical properties, such as stiffness, load resistance, and mechanical and chemical resistance, of these materials should be equivalent to those of synthetically produced thermoplastic molding compositions known from the prior art. It is preferable that these thermoplastic molding compositions prepared from renewable raw materials have at least 50% of ingredients derived from natural sources. The costs for these new molding compositions should be comparable with those for synthetic molding compositions. The new thermoplastic molding compositions should moreover comply with the regulations and requirements for plastics used in the context of foods.

JP 03-241083 of Tajima Inc. discloses a floorcovering and a process for its production. This floorcovering is obtained by mixing a polymerizable vegetable oil, such as linseed oil, a thermoplastic elastomer, such as a styrene elastomer or styrene-butadiene block copolymer, a curing agent, such as trimethylolpropane trimethacrylate, and a filler, such as cork powder or wood chips, and converting them to the desired shape, and then irradiating them with high-energy radiation, for example, with UV radiation. The resultant material does not comprise any particles, but instead is composed of a relatively homogeneous, cured composition, which cannot then undergo any further thermoplastic processing.

BRIEF SUMMARY

It is an object of the present invention to provide a thermoplastic molding composition which is mainly composed of materials of natural origin, and which has, varying with the mixing ratio of the components, stiffness comparable with that of impact-resistant polystyrene (HIPS), or is elastic, and which can be produced at low cost. The thermoplastic molding composition is moreover intended to have improved mechanical properties when compared with materials of the prior art, for example in relation to scratch resistance, and to exhibit an advantageous combination of stiffness/surface hardness with impact resistance and aging resistance and weathering resistance.

Said objects are achieved by the thermoplastic molding composition of the invention, at least comprising:
(A) particles made of nonoxidatively polymerized vegetable oil which has been crosslinked by way of functional groups, as component (A),
(B) at least one thermoplastic polymer, as component (B),
(C) optionally at least one resin, as component (C),
(D) optionally at least one filler, as component (D), and
(E) optionally further additives.

The object of the invention is moreover achieved via use of this type of molding composition, and a process for producing the same.

DETAILED DESCRIPTION OF THE PREFERRED EMBODIMENTS

The thermoplastic molding composition of the present invention is described in detail hereinafter.

Component A:

The thermoplastic molding composition of the invention comprises, as component A, particles made of nonoxidatively polymerized vegetable oil which has been crosslinked by way of functional groups.

Suitable vegetable oils which are polymerized nonoxidatively in the invention and are present in said polymerized form in the particle as component A in the thermoplastic molding composition are cited by way of example in *Drying oils and related products,* 2005, Verlag Wiley-VCH, Weinheim, pp. 1 to 16.

Examples of vegetable oils that can be used with preference are those selected from the group consisting of linseed oil, perilla oil, tung oil, oiticica oil, fish oils, safflower oil, sunflower oil, soybean oil, cottonseed oil, and mixtures thereof. It is preferable to use linseed oil, soybean oil, or a mixture thereof.

One preferred embodiment of the present invention provides the thermoplastic molding composition of the invention where the vegetable oil has been selected from the group consisting of linseed oil, perilla oil, tung oil, oiticica oil, fish oils, safflower oil, sunflower oil, soybean oil, cottonseed oil, and mixtures thereof.

Said oils can be obtained on an industrial scale by cold or hot pressing of the corresponding seeds. Purification of the resultant oils by distillation is optional.

Nonoxidative polymerization is used to polymerize the vegetable oil present in component A of the thermoplastic molding composition of the invention.

In the case of oils having unconjugated double bonds, the first step of the polymerization reaction of the invention preferably consists in isomerization of the unconjugated double bonds to give conjugated double bonds. In the case of oils having conjugated double bonds, there is no need for isomerization to form conjugated double bonds.

The nonoxidative polymerization of the at least one vegetable oil preferably takes place in a Diels-Alder reaction, particularly preferably in an intermolecular Diels-Alder reaction.

In one preferred embodiment, therefore, the at least one nonoxidatively polymerized vegetable oil present in component A of the thermoplastic molding composition of the invention is the product of an intermolecular Diels-Alder reaction of the at least one vegetable oil. It is also possible in the invention that products of intramolecular Diels-Alder reaction of the at least one vegetable oil are also present in component A. However, since the intramolecular reaction inhibits increase of the molecular weight of the polymer, this reaction is not preferred. The mechanism of the Diels-Alder reaction is known to the person skilled in the art and is described by way of example in J. March, Advanced Organic Chemistry, Third Edition, Wiley-Interscience 1985, pp. 745-768.

During the course of the reaction, a vegetable oil polymer is produced by repeated Diels-Alder reactions of the vegetable oil molecules present in the reaction mixture, and/or of the previously formed Diels-Alder products.

The FIGURE below is a diagram showing the mechanism in generalized terms. This FIGURE is intended merely to provide an example of an explanation of the polymerization process for obtaining component A, without restricting said process.

The at least one vegetable oil (I) which has unconjugated double bonds is exposed to isomerization to form a corresponding compound (II) which comprises conjugated double bonds. If the substrate used comprises a vegetable oil which comprises conjugated double bonds, the isomerization step can be omitted. If the vegetable oil used comprises not only conjugated but also unconjugated double bonds, partial isomerization can take place.

In another embodiment of the process of the invention, the particles present as component A comprise a copolymer of at least one vegetable oil and of at least one ethylenically unsaturated monomer.

The present invention therefore also provides the molding composition of the invention where the particles (component A) comprise a vegetable oil polymer and/or a copolymer of vegetable oil with at least one ethylenically unsaturated monomer.

In order to obtain said vegetable oil-monomer copolymer, the nonoxidative polymerization of the at least one vegetable oil is carried out in the presence of ethylenically unsaturated, and thus polymerizable, compounds. A corresponding process is cited by way of example in Hamann et al., Fette, Seifen, Anstrichmittel, volume 58, No. 7, 1956.

Suitable ethylenically unsaturated compounds are any of the monomers that are known to the person skilled in the art and that can polymerize under thermal conditions and/or in the presence of free-radical initiators with the compounds present in the reaction mixture, preferably by a free-radical mechanism.

Examples of suitable ethylenically unsaturated monomers are monomers of the general formula (I)

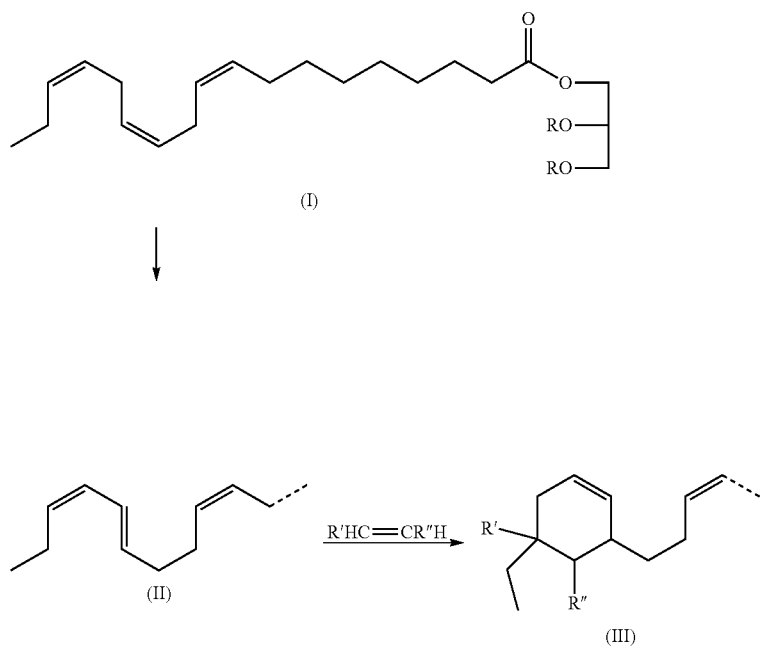

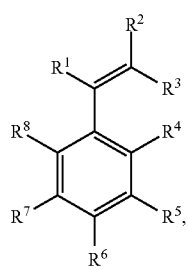
(I)

where the definitions of $R^1$, $R^2$, $R^3$, $R^4$, $R^5$, $R^6$, $R^7$, and $R^8$ are independently of one another as follows:
$R^1$, $R^2$,
$R^3$, $R^4$,
$R^5$, $R^6$,
$R^7$, $R^8$ can be independently of one another hydrogen, $C_1$-$C_{20}$-alkyl, $C_2$-$C_{20}$-alkenyl, $C_2$-$C_{20}$-alkynyl, $C_5$-$C_{20}$-aryl, where the alkyl, alkenyl, and alkynyl radicals can be linear or branched, and can optionally have substitution by functional groups selected from the group consisting of amine group, imine group, ether group, hydroxy group, aldehyde group, keto group, carboxylic acid group, carboxylic anhydride group, nitrile group.

In one preferred embodiment, $R^1$ to $R^3$ are, independently of one another, hydrogen or $C_1$-$C_{20}$-alkyl, particularly preferably hydrogen, methyl, ethyl, or propyl, and $R^4$ to $R^8$ are, independently of one another, hydrogen, methyl, or ethyl. It is very particularly preferable that $R^1$ is hydrogen or methyl, and that $R^2$ to $R^8$ are hydrogen.

In one particularly preferred embodiment, the ethylenically unsaturated aromatic monomers used comprise styrene, α-methylstyrene, para-methylstyrene, para-tert-butylstyrene, vinyltoluene, or a mixture.

Examples of other ethylenically unsaturated monomers suitable for producing the vegetable oil-monomer copolymer in the invention are α,β-unsaturated monocarboxylic acids and derivatives thereof, e.g. acrylic acid, methacrylic acid, acrylic esters, methacrylic esters, acrylonitrile, methacrylonitrile, and mixtures thereof, particularly preferably acrylonitrile.

In one preferred embodiment, the particle present as component (A) comprises a vegetable oil-monomer copolymer which comprises not only the at least one vegetable oil but at least of one monomer selected from the group consisting of styrene, α-methylstyrene, vinyltoluene, acrylonitrile, and mixtures thereof.

The polymeric material present in component A therefore preferably comprises, after the nonoxidative polymerization reaction, in the presence of the abovementioned monomers, polymeric molecules in which there are vegetable oil units and the abovementioned monomers preferably in uniform distribution.

The abovementioned ethylenically unsaturated monomers preferably polymerize with the vegetable oil present and/or with the nonoxidatively polymerized vegetable oil by thermally induced free-radical formation. For this, the monomer is slowly metered in, at temperatures which are preferably above 190° C., particularly preferably from 250 to 300° C., to the initial charge of vegetable oil. By way of example, 3 mol of styrene are metered within a period of 20 hours into 1 mole of pure linseed oil at 250° C., and heating is continued for a further 10 hours. The reaction solution is then preferably styrene-free and comprises by way of example only 0.6% of polystyrene (based on styrene used). The copolymerization of corresponding monomers with fats is summarized on page 12 of U. Poth, Drying Oils and Related Products, in Ullmann's Encyclopedia of Industrial Chemistry, Wiley-VCH, Weinheim, 2002. The process for reaction of fatty acids with, for example, styrene is moreover described in J. Schreiber, "Die Styrolisierungsprozesse" [Styrenizing processes] in Farbe and Lack, 63. volume No. 9 (1957) pp. 443 to 451.

The polymeric material comprised in the particle present as component A and based on at least one vegetable oil and optionally on at least one of the abovementioned ethylenically unsaturated monomers is provided, prior to or after the Diels-Alder reaction for linkage of intermolecular carbon-carbon single and double bonds for producing same.

By way of example, in order to introduce the functional groups into the particles present as component A, the vegetable oil present prior to the nonoxidative polymerization reaction, or the copolymer obtained with at least one further ethylenically unsaturated compound in the preferred Diels-Alder reaction, optionally in the presence of the abovementioned ethylenically unsaturated monomers, is functionalized with suitable compounds, for example having at least two hydroxy functions, in a transesterification reaction. Appropriate compounds are known to the person skilled in the art.

The at least one vegetable oil used in the invention comprises glycerol triesters of the corresponding fatty acids. Reaction of said triesters with compounds which have at least two hydroxy functions produces corresponding esters which have at least one free hydroxy function, given an appropriate molar ratio of vegetable oil and compound having at least two hydroxy functions.

Compounds preferably used for transesterification to produce functional groups are those having at least two hydroxy functions, selected from the group consisting of ethylene glycol, propylene 1,2-glycol, 1,3-propanediol, 1,4-butanediol, 1,6-hexanediol, neopentyl glycol, glycerol, trimethylolpropane, pentaerythritol, sugar alcohols derived from sugars such as sorbitol, etc., triethanolamine, and mixtures thereof. It is also possible to use compounds which have not only at least one hydroxy function but also at least one amino function, an example being ethanolamine, diethanolamine, or a mixture thereof.

In another embodiment, the at least one vegetable oil or, respectively, the polymeric product obtained by the preferred Diels-Alder reaction and based on at least one vegetable oil and optionally on at least one ethylenically unsaturated monomer is functionalized via reaction with a suitable compound in the ene reaction known to the person skilled in the art. If there are residual conjugated double bonds in the product obtained, these will react at least to some extent in a Diels-Alder reaction with maleic anhydride.

This embodiment can generally use any compound that appear to the person skilled in the art to be suitable for an ene reaction, preferably selected from the group consisting of maleic anhydride, maleimide, and mixtures thereof.

The present invention therefore in particular provides the thermoplastic molding composition of the invention where the functional groups present in the particle have been selected from carboxylic anhydride group and hydroxy group.

The mechanism of the ene reaction is known to the person skilled in the art and is described by way of example in U. Poth, Drying Oils and Related Products, in Ullmann's Encyclopedia of Industrial Chemistry, Wiley-VCH, Weinheim, 2002, p. 12, and in J. O. Metzger, U. Biermann, Produkte der thermischen En-Reaktion von ungesättigten Fettstoffen and Maleinsäureanhydrid [Products of the thermal ene reaction of unsaturated fats and maleic anhydride], Fat Sci. Technol. 96 volume No. 9 (1994) pp. 321 to 323. The functionalization of the at least one vegetable oil or of the polymer formed by the nonoxidative polymerization reaction and optionally comprising ethylenically unsaturated monomers introduces functional groups, preferably carboxylic acid groups or carboxylic anhydride groups, particularly preferably succinic anhydride groups, into the polymer.

The functional groups introduced into the at least one vegetable oil or, respectively, the abovementioned polymer, in particular hydroxy groups, carboxylic acid groups, carboxylic ester groups, and/or carboxylic anhydride groups, can be reacted with appropriate reagents in order to achieve crosslinking by way of said functional groups. One preferred embodiment uses reagents which have at least two functional groups which can react with the functional group in the vegetable oil or, respectively, the polymer, and the functionalized polymer is therefore crosslinked via reaction with said reagents.

Examples of reagents suitable for the crosslinking reaction are compounds selected from the group consisting of compounds comprising at least two OH, $NH_2$, NHR, or isocyanate functions, and/or a carboxylic acid function. If anhydride groups are present, particular preference is given to diols, such as ethylene glycol, propylene glycol, 1,4-butanediol, hydroquinone, resorcinol, or pyrocatechol, polyols, such as glycerol, pentaerythritol, or sugar alcohols, diamines, such as ethylenediamine, hexamethylenediamine, decamethylenediamine, phenylenediamines, aminoalcohols, such as ethanolamine, diethanolamine or triethanolamine, and mixtures thereof. If OH groups are present, particular preference is given to diisocyanates, such as hexamethylene diisocyanate, tolylene diisocyanate, or isophorone isocyanate, or oligoisocyanates. Equally suitable compounds are di- and oligoanhydrides, such as oligomers derived from maleic anhydride with other vinylic monomers, such as styrene, or the products of maleization of di- and oligoenes, for example of unsaturated fats.

If the reagent used comprises a compound which comprises at least two hydroxy functions, ester functions are formed in the polymeric material with the carboxylic acid functions preferably present. If the reagent used comprises a compound which comprises at least two amine functions, amide functions are formed in the polymeric material with the carboxylic acid functions preferably present. If the reagent used comprises a compound which comprises at least one hydroxy function and at least one amine function, ester functions and amide functions are formed in the polymeric material with the carboxylic acid functions preferably present. If a diisocyanate is used as crosslinking reagent, urethane groups are formed with the hydroxy functions present in the polymer.

The degree of crosslinking of the polymers based on crosslinked vegetable oil can be determined by rheological methods or by measuring the degree of swelling. These methods are known to the person skilled in the art. DE 10 2008 052 116 A1 discloses that the swelling index in toluene can be calculated from the weight of the solvent-containing gel (after centrifuging at 20 000 rpm) and the weight of the dry gel si=wet weight of gel/dry weight of gel.

To determine the swelling index, by way of example, 250 mg of SBR gel are permitted to swell in 25 ml of toluene with shaking for 24 hours. The gel is isolated by centrifuging and weighed, and then dried to constant weight at 70° C., and again weighed.

In one preferred embodiment of the present invention, the particles present as component A in the thermoplastic molding composition have a shell.

Said particle shell preferably comprises at least one thermoplastic polymer. In one particularly preferred embodiment, the thermoplastic polymer present in the shell is the same as that also present as matrix material (component (B)) in the molding composition of the invention.

The expression thermoplastic polymers is generally used to mean any of the polymers, i.e. homo- and copolymers, which can be deformed reversibly within a particular temperature range, where reversibly means that said procedure can be repeated any desired number of times via cooling and reheating the molten state, as long as there is no thermal decomposition of the material due to overheating.

In the invention, these thermoplastic polymers are generally suitable if they have a glass transition temperature above room temperature, i.e. >25° C. A preferred range for the glass transition temperature is from 50 to 200° C., particularly from 70 to 150° C.

The shell of the particles which are present as component A in the thermoplastic molding composition of the invention can generally comprise any of the thermoplastic polymers that are known to the person skilled in the art and that have a glass transition temperature>25° C.

The present invention therefore also provides the molding composition of the invention where the particles (component A) have a shell which is obtained either via grafting of the nonoxidatively polymerized vegetable oil or via blending with at least one thermoplastic polymer.

In the invention it is preferable to use, in the shell, thermoplastic polymers with a glass transition temperature>25° C., selected from the group consisting of homo- and copolymers composed of vinylic, aromatic monomers, ethylenically unsaturated monomers, and/or dienes.

Suitable vinylaromatic monomers correspond to the general formula (II)

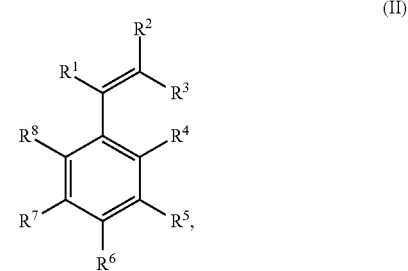

where the definitions of $R^1$, $R^2$, $R^3$, $R^4$, $R^5$, $R^6$, $R^7$, and $R^8$ are independently of one another as follows:
$R^1$, $R^2$,
$R^3$, $R^4$,
$R^5$, $R^6$,
$R^7$, $R^8$ can be independently of one another hydrogen, $C_1$-$C_{20}$-alkyl, $C_2$-$C_{20}$-alkenyl, $C_2$-$C_{20}$-alkynyl, $C_5$-$C_{20}$-aryl, where the alkyl, alkenyl, and alkynyl radicals can be linear or branched, and can optionally have substitution by functional groups selected from the group consisting of amine group, imine group, ether group, hydroxy group, aldehyde group, keto group, carboxylic acid group, carboxylic anhydride group, nitrile group.

In one preferred embodiment, $R^1$ to $R^3$ are, independently of one another, hydrogen or $C_1$-$C_{20}$-alkyl, particularly preferably hydrogen, methyl, ethyl, or propyl, and $R^4$ to $R^8$ are, independently of one another, hydrogen, methyl, or ethyl. It is very particularly preferable that $R^1$ is hydrogen or methyl, and that $R^2$ to $R^8$ are hydrogen.

In one particularly preferred embodiment, at least one thermoplastic polymer with a glass transition temperature>25° C. is present in the shell and is composed of monomers selected from the group consisting of styrene, α-methylstyrene, paramethylstyrene, 1,1-diphenylethylene, para-tert-butylstyrene, vinyltoluene, and mixtures thereof.

Ethylenically unsaturated monomers of which the thermoplastic polymers in the shell of the particle present as component (A) can be composed are those selected from the group consisting of esters and nitriles of α,β-unsaturated mono- and dicarboxylic acids.

Preferred esters of said α,β-unsaturated monocarboxylic acids are reaction products of the abovementioned monocarboxylic acid with compounds which bear at least one OH function, i.e. with mono- or polyhydric alcohols.

Preferred methacrylic esters are $C_1$-$C_8$-alkyl esters of methacrylic acid, as long as the glass transition temperature is >25° C., an example being methyl methacrylate (MMA), ethyl methacrylate, n- or isopropyl methacrylate, n-butyl methacrylate, isobutyl methacrylate, sec-butyl methacrylate, tert-butyl methacrylate, pentyl methacrylate, hexyl methacrylate, heptyl methacrylate, octyl methacrylate, or 2-ethylhexyl methacrylate.

Preferred acrylic esters are $C_1$-$C_8$-alkyl esters of acrylic acid, as long as the glass transition temperature is >25° C., an example being methyl acrylate, ethyl acrylate, n- or isopropyl acrylate, n-butyl acrylate, isobutyl acrylate, sec-butyl acrylate, tert-butyl acrylate, pentyl acrylate, hexyl acrylate, heptyl acrylate, octyl acrylate, or 2-ethylhexyl acrylate.

It is also possible to use a mixture of two or more acrylic esters and/or methacrylic esters.

Suitable nitriles of α,β-unsaturated monocarboxylic acids are acrylonitrile and methacrylonitrile, preference being given here to acrylonitrile.

Suitable α,β-unsaturated dicarboxylic acids or, respectively, α,β-unsaturated dicarboxylic anhydrides are by way of example maleic acid or maleic anhydride.

In the invention, any of the homo- or copolymerizable dienes can be present in the thermoplastic polymer which forms the shell of the particle present as component (A), as long as the glass transition temperature of the thermoplastic polymer is >25° C. Preference is given to use of 1,3-dienes, particularly 1,3-butadiene, 2,3-dimethylbutadiene, 1,3-pentadiene (piperylene), and/or isoprene. Since the glass transition temperature is intended to be >25° C., only small amounts of these monomers can be used, for example less than 25% by weight, preferably less than 15% by weight.

By way of example, the shell of the particles present as component (A) comprises at least one thermoplastic polymer selected from the group consisting of polymethyl methacrylate (PMMA), poly-n-butyl methacrylate (PBMA), polystyrene, styrene-acrylonitrile (SAN), homo- and copolymers composed of vinylic, aromatic monomers, ethylenically unsaturated monomers, and optionally small amounts of dienes, and mixtures thereof. Particularly preferred monomer combinations in copolymers are styrene/acrylonitrile, alpha-methylstyrene/acrylonitrile, alpha-methylstyrene/styrene/acrylonitrile, styrene/methyl methacrylate, and styrene/butyl acrylate/methyl methacrylate.

One particularly preferred embodiment uses, as the shell of the particle present as component A, polystyrene or copolymers comprising styrene.

Polystyrene can be produced by any of the processes known to the person skilled in the art, an example being cationic, anionic, or free-radical-initiated polymerization, in emulsions, solutions, or bulk. The polystyrene present as shell in the particle has a weight-average molar mass which is preferably from 5000 to 500 000 g/mol, particularly preferably from 10 000 to 200 000 g/mol.

The polymer preferably used in the invention and based on vinylaromatic monomers, in particular polystyrene, can be introduced in the form of a block copolymer in combination with a diene block. The block sequence here can be S-B, S-B-S, (S-B)n+1, (S-B)n+1-S, (S-B-S)x (S-B)x, where n=natural number, and x=bi- or oligofunctional coupling agent, and S=vinylaromatic monomer, and B=diene. The ratio by mass of B to S is preferably in the range from 35/65 to 90/10, particularly preferably from 40/60 to 80/20. These block polymers are preferably produced by anionic polymerization. Preference is equally given to use of monomers of type S or grafting onto B-based diene rubbers by a free-radical mechanism.

In another particularly preferred embodiment, the shell used of the particle present as component A comprises a copolymer composed of styrene and acrylonitrile. This copolymer is known as SAN and generally has a weight-average molar mass of from 5000 to 300 000 g/mol, particularly preferably from 10 000 to 200 000 g/mol. Processes for producing a suitable SAN copolymer are known to the person skilled in the art.

The binding of the at least one thermoplastic material present in the shell to the polymerized vegetable oil or, respectively, the copolymer composed of vegetable oil and of at least one ethylenically unsaturated monomer present in the particle can take place via intermolecular interactions or via covalent bonding, in each case between the molecules of the thermoplastic material and the molecules of the polymerized vegetable oil or, respectively, of the copolymer composed of vegetable oil and of at least one ethylenically unsaturated monomer, within the core.

In the invention, it is also possible here that the shell of the particle is coupled to the polymerized vegetable oil present in the particle or, respectively, to the copolymer composed of vegetable oil and of at least one ethylenically unsaturated monomer via polymerization of the monomers specified as suitable for the shell.

In another preferred embodiment, the shell of the particle present as component A comprises, optionally in addition to the cited thermoplastic polymers, at least one block rubber or graft rubber, where the thermoplastic polymer can be coupled thereto by grafting.

It is possible in the invention to use any of the block rubbers or graft rubbers known to the person skilled in the art. It is preferable to use, in component A, ABS copolymers in noncrosslinked form, butadiene-styrene copolymers, or block copolymers which have at least one hard block made of at least one styrene monomer or one derivative thereof, and at least one soft block made of a styrene monomer and also of at least one diene, examples being SBS copolymers. If rubbers are used in the invention, these are added in nonagglomerated, noncrosslinked form.

ABS copolymers are copolymers composed of acrylic acid, butadiene, and styrene. Processes for producing ABS copolymers are known to the person skilled in the art. The invention uses noncrosslinked ABS copolymers.

SBS copolymers are block copolymers composed of styrene and butadiene. SBS copolymers and processes for producing same are described by way of example in WO 97/40079. These block polymers are produced by anionic polymerization in a nonpolar solvent, with initiation by means of organometallic compounds. Preference is given to compounds of the alkali metals, particularly of lithium. Examples of initiators are methyllithium, ethyllithium, propyllithium, n-butyllithium, sec-butyllithium, and tert-butyllithium. The organometallic compound is added in the form of solution in a chemical inert hydrocarbon. The amount added depends on the molecular weight desired for the polymer, but is generally in the range from 0.002 to 5 mol %, based on the monomers. Solvents used preferably comprise aliphatic hydrocarbons, such as cyclohexane or methylcyclohexane.

In the invention, the random blocks which simultaneously comprise styrene and diene in the block copolymers are preferably produced with addition of a soluble potassium salt, in particular of a potassium alcoholate, in particular tertiary alcoholates having at least 7 carbon atoms. Typical corresponding alcohols are by way of example 3-ethyl-3-pentanol and 2,3-dimethyl-3-pentanol. Tetrahydrolinalool (3,7-dimethyl-3-octanol) is particularly suitable. In principle, other potassium salts which are inert to alkyl metal compounds are also suitable, alongside the potassium alcoholates. Mention may be made here of dialkylpotassium amides, alkylated diarylpotassium amides, alkyl thiolates and alkylated arylthiolates. The polymerization temperature can be from 0 to 130° C. Other additives suitable in the invention for producing the random blocks simultaneously comprising styrene and diene are ethers, such as tetrahydrofuran, and tertiary amines, such as tetramethylethylenediamine (TMEDA). These additions increase the proportion of relatively reactive vinylic pendant groups, and in the invention this helps to couple the styrene diene blocks to the vegetable oil polymer.

One embodiment of the present invention particularly preferably uses, as component A, particles which comprise linseed oil as vegetable oil, and an SBS block copolymer as rubber, and have a polystyrene shell. In another preferred embodiment, the particles used as component A comprise linseed oil as vegetable oil, a graft rubber based on styrene and/or butadiene, and a shell made of a styrene-acrylonitrile copolymer. The vegetable-oil-based polymers here are respectively preferably functionalized with maleic anhydride, and the crosslinking preferably takes place via reagents having at least two hydroxy functions.

The production of the crosslinked vegetable oil core and the selection of the graft shell are independent of one another, but it is preferable to balance the polarity of the polymeric vegetable oil with the rubber blocks or, respectively, with the rubber graft base. If pure vegetable oil is used, in particular linseed oil, it is preferable to incorporate no, or only a little, styrene, i.e. from 0 to 30% by weight, into the rubber block, but if vegetable oil is copolymerized with at least one ethylenically unsaturated monomer it is preferable to incorporate correspondingly more, i.e. from 31 to 50% by weight.

The diameter of the particles which are present as component A in the thermoplastic molding composition of the invention is generally from 1 to 100 μm, preferably from 1 to 10 μm. The layer thickness of the shell of the particle present as component A is generally from 10 to 100 nm.

The amount of component A present in the thermoplastic molding composition of the invention is generally from 10 to 70% by weight, preferably from 40 to 60% by weight, based in each case on the entire thermoplastic molding composition.

Another possibility in the invention consists in grafting polymer chains, for example polystyrene, SAN, PMMA, at various junctures onto the polyvegetable oil. This can take place as early as the stage represented by the pure oil, where the monomer is used as initial charge together with the oil and then polymerization is carried out at temperatures which lead to the desired molar mass, for example from 100 to 250° C. The oil then undergoes partial grafting, but hardly any copolymerization. It is preferable, instead of this, to use the polyvegetable oil. Another possibility consists in first crosslinking the polyvegetable oil and then swelling the crosslinked particles with monomer and optionally free-radical initiator, and then polymerizing the dispersion. This procedure gives particularly reliable coupling of the thermoplastic chains to the polyvegetable oil. In this procedure it is also possible to polymerize the matrix simultaneously.

In one particularly preferred embodiment, the polymerized vegetable oil is reacted with maleic anhydride (MA) for functionalization. This functionalized polymer is then collected with a small amount, preferably a significantly substoichiometric amount, based on MA, of monomers comprising at least one double bond and comprising at least one hydroxy function, an example being hydroxymethyl methacrylate (HEMA) or allyl alcohol, so that double bonds are obtained at the particle surface, since the hydroxy functions react with the maleic anhydride groups. These can then be reacted with the monomers of which the polymer of the matrix is composed.

In another particularly preferred embodiment, the polymerized vegetable oil is functionalized with hydroxy functions. This functionalized polymer is then reacted with a small amount, preferably a significantly substoichiometric amount, based on the hydroxy functions introduced, of monomers comprising at least one double bond and comprising at least one carboxylic acid function, examples being reactive (meth)acrylic acids, MA, or chlorides or anhydrides of unsaturated carboxylic acids, or unsaturated isocyanates, so that double bonds are obtained on the particle surface, since the carboxylic acid functions react with the hydroxy functions located on the surface. These can then be reacted with the monomers of which the polymer of the matrix is composed.

Component B:

The thermoplastic molding composition of the invention comprises at least one thermoplastic polymer as component (B). This thermoplastic polymer forms what is known as the "matrix" of the thermoplastic molding composition.

In general terms, the thermoplastic molding composition of the invention can use, as component (B), any of the suitable thermoplastic polymers known to the person skilled in the art.

It is preferable to use, as component (B), at least one thermoplastic polymer which is compatible with the at least one thermoplastic polymer present in the optionally present shell of the particles (component A).

For the purposes of the present invention, "compatible" means that good interfacial adhesion is achieved, thus ensuring the mechanical coupling of the vegetable oil particles. It is therefore moreover intended that no incompatibility reactions occur between the two thermoplastics, examples being decomposition, demixing, chemical reactions, discoloration effects, or adverse effects on the mechanical properties of the thermoplastic molding composition of the present invention.

Thermoplastic polymers suitable as component B are preferably those selected from the group consisting of copolymers of at least one vinylic, aromatic monomer and, if appropriate, of at least one α,β-unsaturated monocarboxylic acid or the corresponding nitrile, examples being polystyrene (PS) or styrene-acrylonitrile (SAN). Other suitable thermoplastic polymers are those selected from the group consisting of polycarbonates (PC), polyurethanes (PU), polyesters, such as polyethylene terephthalates (PET) or polybutylene terephthalates (PBT), polyvinyl chlorides (PVC), polyurethanes (PU), polyoxymethylenes (POM), polymethyl methacrylates (PMMA), and biodegradable homo- and copolymers, such as polylactides or polybutyrate.

In one preferred embodiment, the at least one thermoplastic polymer used as component B is selected from the group consisting of polystyrenes, polyesters, styrene-acrylonitrile copolymers, polycarbonates, polyurethanes and biodegradable polymers, for example polylactides or polybutyrate.

Processes for the production of polystyrene and of copolymers of styrene and acrylonitrile have been explained above.

Polycarbonates are polymers formally obtainable via reaction of carbonic acid and compounds having at least two hydroxy functions. By way of example, they are accessible via reaction of the corresponding alcohols with phosgene or carbonic diesters in polycondensation and transesterification reactions.

Polyesters suitable for the inventive thermoplastic molding composition are preferably those selected from the group consisting of polyethylene terephthalate, polybutylene terephthalate, polytrimethylene terephthalate, and blends thereof. Polyesters can be obtained via reaction of diols with dicarboxylic acids or reaction of hydroxycarboxylic acids.

Polyurethanes are copolymers obtained via polyaddition of compounds having at least two hydroxy functions and compounds which have at least two isocyanate groups. Examples of polyurethanes to be used according to the invention are those produced from polyester- and/or polyetherdiols and, for example, from toluene 2,4- or 2,6-diisocyanate, methylene 4,4'-di(phenyl isocyanate), and hexamethylene diisocyanate. Linear or branched polyurethanes can be used.

In one preferred embodiment of the thermoplastic molding composition of the invention, at least one biodegradable polymer is used as component B. Examples of biodegradable polymers are known to the person skilled in the art, and include polylactides or polybutyrate.

Polylactides, also termed polylactic acids, occur in the optically active D- or L-form, by virtue of the asymmetric carbon atom. Polylactides that can be used according to the invention can be prepared by any of the processes known to the person skilled in the art.

By way of example, polylactides are accessible via the ionic polymerization of lactide, a cyclic adduct of two lactic acid molecules. Polylactide is formed in a ring-opening polymerization reaction at temperatures of from 140 to 180° C. with exposure to catalytic tin compounds, such as tin oxide. Lactide itself can be produced via fermentation of molasses or via fermentation of glucose, with the aid of various bacteria. High-molecular-weight, and pure, polylactides can moreover be produced directly from lactic acid via polycondensation.

Component B can also be a mixture of the abovementioned thermoplastic of one another, or a mixture of the abovementioned thermoplastics with one another with what are known as "toughness boosters" as addition, where these for biodegradable polymers are preferably those selected from a mixture of aromatic and aliphatic esters based on poly-epsilon-caprolactone and 1,4-butanediol. As far as the styrene polymers (and also the other polymers) are concerned, block copolymers of SBS, SEBS, SIS and SEPS type can be used.

The amounts present of these additions are generally those known to the person skilled in the art to be suitable.

In one preferred embodiment, component B used, if the shell of the particle (component A) comprises polystyrene, likewise comprises polystyrene, optionally in a mixture with a styrene-butadiene block copolymer. In another preferred embodiment, component B used, if the shell of the particle (component A) comprises styrene-acrylonitrile, likewise comprises styrene/acrylonitrile, polymethyl methacrylate, styrene/MMA, polyester, polyurethane or polylactide, optionally in a mixture with the abovementioned styrene-butadiene block copolymers.

The amount generally present of the thermoplastic polymer used as component B in the thermoplastic molding composition of the invention is from 20 to 80% by weight, preferably from 30 to 70% by weight, particularly preferably from 40 to 60% by weight, based in each case on the total weight of the thermoplastic molding composition.

Component C:

The thermoplastic molding composition of the present invention optionally comprises, as component C, at least one resin.

According to the invention, either synthetically produced resins or else naturally occurring resins can be used.

*Natural Resins*, Wiley-VCH Verlag, Weinheim, 2005, pages 1 to 19 discloses a selection of natural resins which can be used in the thermoplastic molding composition according to the present invention.

Particularly preferred natural resins are those selected from the group consisting of acaroid resin, amber, asphaltite, Peru balsam, Toru balsam, benzoin, Canada balsam, Chinese or Japanese lacquer, copal, damar, dragon's blood resin, elemi, olibanum, galbanum, labdanum, mastic, myrrh, gum juniper, shellac, styrax, Utah resin, Venetian turpentine, colophonium, and mixtures thereof. Colophonium is particularly preferably used.

These resins occur in nature and can be isolated or obtained by processes known to the person skilled in the art, for example by making an incision in the bark of the corresponding tree and collecting the resin, or extracting the wood of the corresponding tree with suitable solvents, such as naphtha.

Suitable synthetically produced resins are generally copolymers, for example low-molecular-weight thermoplastic materials, e.g. low-molecular-weight polyesters. These are known to the person skilled in the art.

In one preferred embodiment, the at least one resin (component C) is present in the particles (component A). The present invention therefore preferably provides the molding composition of the invention where at least one resin (component C) is present in the particles (component A).

If component C is present in the thermoplastic molding composition of the invention, the amount thereof is generally from 1 to 30% by weight, preferably from 5 to 30% by weight, particularly preferably from 10 to 30% by weight, based in each case on the total weight of the thermoplastic molding composition of the invention. These resins increase the glass transition temperature of component A and stiffen the product.

Component D:

The thermoplastic molding composition of the invention optionally comprises, as component D, at least one filler.

Component D used can comprise any of the fillers known to the person skilled in the art which are suitable for use in polymeric materials. Examples of suitable fillers are mineral fillers, salts, e.g. carbonates of the alkali metals and of the alkaline earth metals, an example being calcium carbonate, or compounds such as titanium dioxide, zirconium dioxide, and mixtures thereof.

Other suitable fillers are those selected from the group consisting of cork flour, for example from recycled bottle corks, and wood flour, preferably with a particle size smaller than 0.5 mm, particularly preferably smaller than 0.2 mm. The proportion of the wood flour can be above 50% by weight, preferably above 70% by weight, and the maximum amount here is 90% by weight. It is preferable to add the wood flour to the melt of the finished thermoplastic. These wood-plastic composites, WPcs, are improved mechanically by adding from 5 to 10% by weight of polymers which comprise anhydride groups and by way of example by copolymerization with from 1 to 10% by weight of maleic anhydride, where the anhydride groups react with the components of the wood.

In order to avoid overheating and carbonization of the wood component, it is preferable to add amounts of up to 5% by weight of waxes based on fatty acid, e.g. stearylamide or erucamide.

Another particularly preferred filler used is calcium carbonate.

The suitable particle size of the filler used as component D is known to the person skilled in the art.

If component D is present in the thermoplastic molding composition of the invention, the amount present thereof, for mineral fillers, is generally up to 50% by weight, preferably from 20 to 30% by weight.

Component E:

Further additives can optionally be present as component E in the thermoplastic molding composition of the invention.

Suitable further additives are well known to the person skilled in the art, examples being dyes, UV stabilizers, bleaching agents, deodorants, antioxidants, and mixtures thereof.

If the thermoplastic molding composition comprises further additives as component E, the amount generally present as component E is from 0.1 to 2% by weight, preferably from 1 to 2% by weight, based in each case on the entire thermoplastic molding composition.

The total of the amounts of components A and B and optionally C, D, and/or E present in the thermoplastic molding composition of the invention is always 100% by weight.

The present invention also provides a process for producing the thermoplastic molding composition of the invention, comprising at least the following steps:

(1) nonoxidative polymerization of at least one vegetable oil, optionally in the presence of at least one ethylenically unsaturated monomer, in order to obtain a polymerized vegetable oil or, respectively, a copolymer of vegetable oil and of at least one ethylenically unsaturated monomer, and (2) introducing functional groups into the polymerized vegetable oil or, respectively, into the copolymer of vegetable oil and of at least one ethylenically unsaturated monomer from step (1), in order to obtain a functionalized polymerized vegetable oil or, respectively, copolymer of vegetable oil and of at least one ethylenically unsaturated monomer, or (3) introducing functional groups into at least one vegetable oil, in order to obtain a functionalized vegetable oil, and (4) nonoxidative polymerization of the functionalized vegetable oil from step (3), optionally in the presence of at least one ethylenically unsaturated monomer, in order to obtain a functionalized polymerized vegetable oil or, respectively, copolymer of vegetable oil and of at least one ethylenically unsaturated monomer, (5) adding the at least one thermoplastic polymer (component B) to the functionalized polymerized vegetable oil or, respectively, copolymer of vegetable oil and of at least one ethylenically unsaturated monomer, from step (2) or (4), in order to obtain a mixture, and (6) crosslinking the mixture from step (5) by adding at least one reagent which reacts with the functional groups introduced in step (1) or (2), in order to obtain the thermoplastic molding composition.

The sequence (1), (2), (5), and (6) is preferred in the invention. Preference is further given to the sequence (3), (4), (5), and (6). The sequence (5), (1), (2), and (6) or (5), (3), (4), and (6) is also possible in the invention.

The individual steps of the process of the invention are described in detail below:

Step (1):

Step (1) of the process of the invention comprises the nonoxidative polymerization of at least one vegetable oil, optionally in the presence of at least one ethylenically unsaturated monomer, in order to obtain a polymerized vegetable oil and, respectively, a copolymer made of vegetable oil and of at least one ethylenically unsaturated monomer.

The invention can treat the at least one vegetable oil, optionally in the presence of at least one ethylenically unsaturated monomer, by any of the nonoxidative processes known to the person skilled in the art which lead to at least partial polymerization of the at least one vegetable oil with the at least one ethylenically unsaturated monomer optionally present. For the purposes of the present invention, "nonoxidative" means that, in step (1) of the process of the invention, there are no substances present which have oxidizing action with respect to the at least one vegetable oil.

In one preferred embodiment of the process of the invention, the polymerization of the vegetable oil in step (1) takes place by a Diels-Alder reaction, for example intermolecularly and/or intramolecularly, particularly preferably via an intermolecular Diels-Alder reaction.

The present invention therefore preferably provides the process of the invention where the polymerization reaction in step (1) takes place by a Diels-Alder reaction.

In one preferred embodiment of the process of the invention, using only at least one vegetable oil, this is reacted in step (1) under conditions which lead to polymerization of the at least one vegetable oil in a Diels-Alder reaction, preferably in an intermolecular Diels-Alder reaction. The Diels-Alder reaction is known to the person skilled in the art and is described by way of example in J. March, Advanced Organic Chemistry, Third Edition, Wiley-Interscience 1985, pages 745-768. There is a diagram at an earlier stage above in relation to component A of the thermoplastic molding composition.

If the process of the invention uses at least one vegetable oil which has unconjugated double bonds, in one preferred embodiment, in step (1), said unconjugated double bonds are first isomerized to give conjugated double bonds. In one preferred embodiment the conditions under which this isomerization takes place are the same as those for the Diels-Alder reaction, so that molecules having unconjugated double bonds are preferably isomerized in situ to give molecules having conjugated double bonds.

Step (1) of the process of the invention can be carried out in the presence or absence of a solvent. Suitable solvents are known per se to the person skilled in the art, and these preferably comprise no groups that are reactive under the prevailing conditions.

Step (1) is preferably carried out in the absence of a solvent, and the at least one vegetable oil is therefore preferably reacted in bulk.

Since the polymerization reaction in step (1) of the process of the invention is carried out nonoxidatively, step (1) is carried out in the absence of any substance having oxidizing effect. The invention preferably carries out the polymerization reaction in step (1) with exclusion of air, for example through blanketing/flushing with inert gas, such as nitrogen, argon, or carbon dioxide.

As far as the vegetable oil is concerned, the statements made above in relation to the thermoplastic molding composition of the invention are applicable.

The nonoxidative polymerization of the at least one vegetable oil in step (1) by a Diels-Alder reaction, preferably an intermolecular Diels-Alder reaction, optionally combined with prior isomerization of unconjugated double bonds to give conjugated double bonds, generally takes place at a temperature which ensures sufficient reaction rate, and in one preferred embodiment step (1) of the process of the invention is carried out at a temperature of from 200 to 400° C., particularly from 250 to 350° C., for example at from 280 to 300° C.

Step (1) of the process of the invention can be carried out at any pressure, for example at atmospheric pressure.

Reaction time in step (1) of the process of the invention is generally selected in such a way as to ensure adequate conversion, i.e. adequate degree of polymerization of the at least one vegetable oil. The reaction time is by way of example from 30 to 60 h, preferably from 38 to 50 h.

Step (1) of the process of the invention can be carried out in any reactor which appears to the person skilled in the art to be suitable for this type of reaction, examples being stirred tanks for batch processes, segregated stirred tank, conical-base reactor, stirred-tank cascade, tower reactor, or tubular reactor, for continuous processes.

In another preferred embodiment, step (1) of the process of the invention comprises the nonoxidative polymerization of at least one vegetable oil in the presence of at least one ethylenically unsaturated monomer, in order to obtain a polymerized vegetable oil or, respectively, a copolymer of vegetable oil and of at least one ethylenically unsaturated monomer. The document cited above, Hamann et al., mentions a corresponding process.

Suitable and preferred ethylenically unsaturated monomers which can be used in step (1) of the process of the invention have already been mentioned above in relation to component (A) of the process of the invention.

It is particularly preferable in said embodiment of step (1) of the process of the invention to use a mixture made of at least one vegetable oil and of at least one ethylenically unsaturated monomer selected from the group consisting of styrene, α-methylstyrene, para-methylstyrene, 1,1-diphenylethylene, para-tert-butylstyrene, vinyltoluene, acrylic ester, methacrylic ester, acrylonitrile, methacrylonitrile, and mixtures thereof.

In said embodiment of step (1), a copolymer is formed from the at least one vegetable oil and from the at least one ethylenically unsaturated monomer. In the invention, the at least one vegetable oil here preferably polymerizes in the Diels-Alder reaction described above. The at least one ethylenically unsaturated monomer present polymerizes with itself, with the at least one vegetable oil, and/or with previously formed Diels-Alder products, preferably in a free-radical polymerization reaction.

The present invention also provides the process of the invention where the polymerization of the vegetable oil or of the vegetable oil polymer and of the ethylenically unsaturated monomer in step (1) or (4) is a thermally induced polymerization reaction.

In the invention, it is preferable here that the free radicals necessary for this purpose do not pass into the reaction mixture by virtue of free-radical initiators which are known to the person skilled in the art and which have to be added externally, but instead that said radicals are formed from the monomers present under the temperatures prevailing in the invention, i.e. thermally.

To this end, the at least one ethylenically unsaturated monomer is added to the at least one vegetable oil, generally in an amount in which it is also intended to be present in the polymeric material that forms the particle. By way of example, from 5 to 60% by weight of at least one ethylenically unsaturated monomer are added, preferably from 15 to 50% by weight, for polymerization together with the at least one vegetable oil under the conditions prevailing in step (1) of the process of the invention.

The Diels-Alder reaction in the presence of the abovementioned monomers therefore preferably gives a polymeric material which has been formed by a Diels-Alder reaction of the at least one vegetable oil and which simultaneously comprises structural units formed from the abovementioned monomers.

In one preferred embodiment, the polymeric material obtained in step (1) of the process of the invention, and based on at least one vegetable oil and optionally on at least one ethylenically unsaturated monomer, takes the form of viscous, pale yellow oil, or of rubber.

In one preferred embodiment of the present invention, the at least one thermoplastic polymer and, respectively, ethylenically unsaturated monomers of which the thermoplastic polymer optionally present in the shell of the particles is composed are added in step (1), so that the particles comprising a polymeric material based on at least one vegetable oil as core and comprising a shell made of at least one thermoplastic polymer form in step (1). Variations in thermal conditions here can be used to favor formation of vegetable oil copolymers or of graft polymers for the shell.

As far as the thermoplastic polymer and, respectively, the corresponding monomers are concerned, where this/these is/are present in the shell of the particles, the statements made above in relation to the thermoplastic molding composition of the invention are applicable.

In one preferred embodiment, the amount added of the thermoplastic polymer and, respectively, the corresponding monomers, where this/these is/are present in the shell of the particles, is by way of example from 3 to 50% by weight, preferably from 5 to 20% by weight, based in each case on the entirety of the starting materials in step (1).

Step (2):

Step (2) of the process of the invention comprises introducing functional groups into the polymerized vegetable oil or, respectively, into the copolymer of vegetable oil and of at least one ethylenically unsaturated monomer from step (1), in order to obtain a functionalized vegetable oil or, respectively, copolymer of vegetable oil and of at least one ethylenically unsaturated monomer.

The polymeric material obtained in step (1) is functionalized by reacting same with at least one functionalizing compound.

Suitable functionalizing compounds and amounts of these have been specified above in relation to the thermoplastic molding composition. For functionalization, it is preferable to use α,β-unsaturated mono- or dicarboxylic acids, esters, anhydrides, or nitriles thereof, or compounds having at least two hydroxy functions. Very particular preference is given to maleic anhydride. The amounts generally used of compounds used for functionalization, in particular maleic anhydride, are from 0.1 to 20% by weight, preferably from 1 to 10% by weight, particularly preferably from 3 to 9% by weight, based in each case on the polymeric material.

The functional groups particularly preferably introduced in the invention are anhydride group and hydroxy group.

Step (2) of the process of the invention preferably reacts the polymeric material from step (1) in an ene reaction with the at least one functionalizing compound, in particular maleic anhydride. This reaction is known to the person skilled in the art and is described in U. Poth, Drying Oils and Related Products, in Ullmann's Encyclopedia of Industrial Chemistry, Wiley-VCH, Weinheim, 2002, page 12, and in J. O.

Metzger, U. Biermann, Produkte der thermischen En-Reaktion von ungesättigten Fettstoffen, and Maleinsäureanhydrid [Products of the thermal ene reaction of unsaturated fats and maleic anhydride] Fat Sci. Technol. 96 volume No. 9 (1994) pages 321 to 323. The functionalization of the vegetable-oil-based polymer with maleic anhydride can also or simultaneously take place by a Diels-Alder reaction.

The possible reactions of vegetable-oil-based polymers with maleic anhydride are depicted below by way of example:

Diels-Alder reaction:

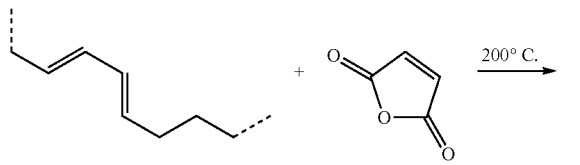

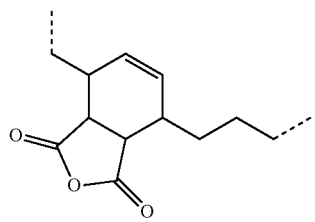

Ene reaction:

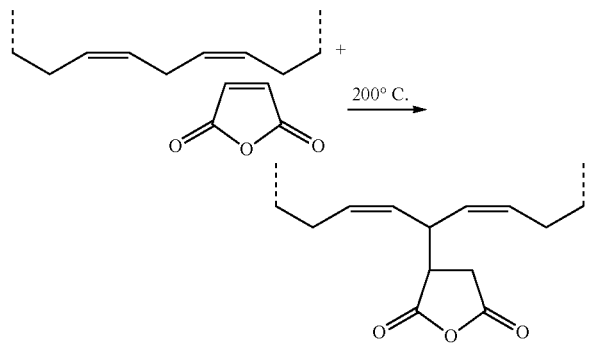

These embodiments of step (2) of the process of the invention are generally carried out at a suitable reaction temperature, for example from 100 to 350° C., preferably from 150 to 300° C., particularly preferably from 160 to 280° C.

It is also possible, in another embodiment, that the polymeric material obtained in step (1) of the process of the invention is functionalized by compounds which have at least two hydroxy functions. Details of this, and preferred compounds that can be used, have been mentioned above. In this type of functionalization, the triglycerides present in the vegetable oil are reacted via exposure to compounds having at least two hydroxy functions to give compounds having at least one free hydroxy function, in a transesterification reaction. In the invention, said transesterification reaction preferably takes place with exposure to a basic compound, for example to an aqueous sodium hydroxide solution and/or aqueous potassium hydroxide solution, or to other transesterification catalysts.

Said transesterification reaction can by way of example be carried out at from 100 to 350° C., preferably from 150 to 300° C., particularly preferably from 160 to 280° C.

Step (2) gives a polymeric material which comprises functional groups, preferably carboxylic acid groups and/or hydroxy groups, particularly preferably succinic acid groups and/or hydroxy groups.

In one preferred embodiment of the process of the invention, all of the steps are carried out in the absence of a solvent, i.e. in bulk.

Steps (1) and (2) of the process of the invention are parts of a first embodiment in which a polymeric material is first formed and is then functionalized.

Steps (3) and (4) are parts of a second embodiment of the process of the invention, where a vegetable oil is first functionalized, and said functionalized vegetable oil is reacted optionally in the presence of further ethylenically unsaturated monomers to give a polymeric material.

Step (3):

Step (3) of the process of the invention comprises introducing functional groups into at least one vegetable oil, in order to obtain a functionalized vegetable oil.

In principle, the functionalization in step (3) proceeds by analogy with the functionalization in step (2) of the process of the invention, except that in step (3) it is monomers rather than polymers that are functionalized.

The vegetable oils that can be used in step (3) have been mentioned above.

For functionalization of the at least one vegetable oil in step (3), this is reacted with at least one functionalizing compound.

Suitable functionalizing compounds and amounts of these have been specified above in relation to the thermoplastic molding composition. The functionalization reaction particularly preferably uses α,β-unsaturated mono- or dicarboxylic acids, esters, anhydrides, or nitriles thereof, or compounds thereof having at least two hydroxy functions. Very particularly preferred examples are maleic acid and/or maleic anhydride, in particular maleic anhydride. The amount used of the compounds used for the functionalization reaction, in particular maleic anhydride, are generally from 0.1 to 20% by weight, preferably from 1 to 10% by weight, particularly preferably from 3 to 9% by weight, based in each case on the at least one vegetable oil.

Step (3) of the process of the invention preferably reacts the at least one vegetable oil in an ene reaction with the at least one functionalizing compound, in particular maleic anhydride. This reaction is known to the person skilled in the art and is described by way of example in U. Poth, Drying Oils and Related Products, in Ullmann's Encyclopedia of Industrial Chemistry, Wiley-VCH, Weinheim, 2002, page 12, and in J. O. Metzger, U. Biermann, Produkte der thermischen En-Reaktion von ungesättigten Fettstoffen and Maleinsäureanhydrid [Products of the thermal ene reaction of unsaturated fats and maleic anhydride] Fat Sci. Technol. 96 volume No. 9 (1994) pages 321 to 323. The functionalization of the vegetable oil with maleic anhydride can also take place by a Diels-Alder reaction.

The possible reactions of vegetable oil with maleic anhydride are depicted below by way of example:

Diels-Alder reaction:

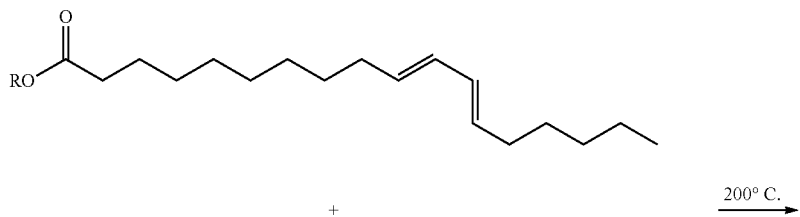

Ene reaction:

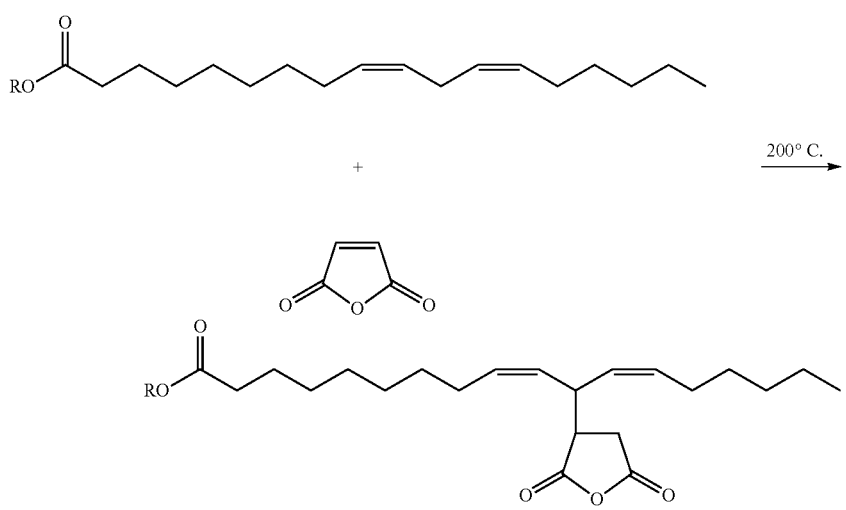

These embodiments of step (3) of the process of the invention are generally carried out at a suitable reaction temperature, for example from 100 to 350° C., preferably from 150 to 300° C., particularly preferably from 160 to 280° C.

It is also possible, in another embodiment, in step (3) of the process of the invention, to functionalize at least one vegetable oil by using compounds which have at least two hydroxy functions. Details of this, and preferred compounds that can be used, have been mentioned above. In this type of functionalization, the triglycerides present in the vegetable oil are reacted via exposure to compounds having at least two hydroxy functions to give compounds having at least one free hydroxy function. In the invention, said transesterification reaction preferably takes place with exposure to a basic compound, for example to an aqueous sodium hydroxide solution and/or aqueous potassium hydroxide solution, or to other transesterification catalysts.

Said transesterification reaction can by way of example be carried out at from 100 to 350° C., preferably from 150 to 300° C., particularly preferably from 160 to 280° C.

Step (3) gives a monomeric material which is based on at least one vegetable oil and which comprises functional groups, preferably carboxylic acid groups and/or hydroxy groups, particularly preferably succinic acid groups and/or hydroxy groups.

Step (4):

Step (4) of the process of the invention comprises the nonoxidative polymerization of the functionalized vegetable oil from step (3), optionally in the presence of at least one ethylenically unsaturated monomer, in order to obtain a functionalized polymerized vegetable oil or, respectively, copolymer of vegetable oil and of at least one ethylenically unsaturated monomer.

In principle, the polymerization reaction in step (4) of the process of the invention corresponds to the polymerization reaction described in relation to step (1), except that step (4)

uses the functionalized vegetable oil molecules, whereas step (1) uses vegetable oil molecules that have not (yet) been functionalized.

Step (4) of the process of the invention comprises the nonoxidative polymerization of at least one functionalized vegetable oil, optionally in the presence of at least one ethylenically unsaturated monomer, in order to obtain a polymerized functionalized vegetable oil or, respectively, a functionalized copolymer of vegetable oil and of at least one ethylenically unsaturated monomer.

The invention can treat the at least one functionalized vegetable oil, optionally in the presence of at least one ethylenically unsaturated monomer, by any of the nonoxidative processes known to the person skilled in the art which lead to at least partial polymerization of the at least one vegetable oil with the at least one ethylenically unsaturated monomer optionally present. For the purposes of the present invention, "nonoxidative" means that, in step (4) of the process of the invention, there are no substances present which have oxidizing action with respect to the at least one functionalized vegetable oil.

In one preferred embodiment of the process of the invention, the polymerization reaction in step (4) takes place by a Diels-Alder reaction, for example intermolecularly and/or intramolecularly, particularly preferably via an intermolecular Diels-Alder reaction.

In one preferred embodiment of the process of the invention, using only at least one functionalized vegetable oil, this is reacted in step (4) under conditions which lead to polymerization of the at least one functionalized vegetable oil in a Diels-Alder reaction, preferably in an intermolecular Diels-Alder reaction. The Diels-Alder reaction is known to the person skilled in the art and is described by way of example in J. March, Advanced Organic Chemistry, Third Edition, Wiley-Interscience 1985, pages 745-768.

There is a diagram at an earlier stage above in relation to component A of the thermoplastic molding composition.

If the process of the invention uses at least one functionalized vegetable oil which has unconjugated double bonds, in one preferred embodiment, in step (4), said unconjugated double bonds are first isomerized to give conjugated double bonds. In one preferred embodiment the conditions under which this isomerization takes place are the same as those for the Diels-Alder reaction, so that molecules having unconjugated double bonds are preferably isomerized in situ to give molecules having conjugated double bonds.

Step (4) of the process of the invention can be carried out in the presence or absence of a solvent. Suitable solvents are known per se to the person skilled in the art, and these preferably comprise no groups that are reactive under the prevailing conditions.

Step (4) is preferably carried out in the absence of a solvent, and the at least one functionalized vegetable oil is therefore preferably reacted in bulk.

Since the polymerization reaction in step (4) of the process of the invention is carried out nonoxidatively, step (4) is carried out in the absence of any substance having oxidizing effect. In the invention it is preferable that step (4) is carried out with exclusion of air, for example by blanketing/flushing with inert gas, such as nitrogen, argon, or carbon dioxide.

The nonoxidative polymerization of the at least one functionalized vegetable oil in step (4) by a Diels-Alder reaction, preferably an intermolecular Diels-Alder reaction, optionally combined with prior isomerization of unconjugated double bonds to give conjugated double bonds, generally takes place at a temperature which ensures sufficient reaction rate, and in one preferred embodiment step (4) of the process of the invention is carried out at a temperature of from 200 to 400° C., particularly from 250 to 350° C., for example from 280 to 300° C.

Step (4) of the process of the invention can be carried out at any pressure, for example at atmospheric pressure.

The reaction time in step (4) of the process of the invention is generally selected in such a way as to ensure adequate conversion, i.e. adequate degree of polymerization of the at least one vegetable oil. The reaction time is by way of example from 30 to 60 h, preferably from 38 to 50 h.

Step (4) of the process of the invention can be carried out in any reactor which appears to the person skilled in the art to be suitable for this type of reaction, examples being stirred tanks for batch processes, segregated stirred tank, conical-base reactor, stirred-tank cascade, tower reactor, or tubular reactor, for continuous processes.

In another preferred embodiment, step (4) of the process of the invention comprises the nonoxidative polymerization of at least one functionalized vegetable oil in the presence of at least one ethylenically unsaturated monomer, in order to obtain a polymerized vegetable oil or, respectively, a copolymer of functionalized vegetable oil and of at least one ethylenically unsaturated monomer. A suitable process is mentioned by way of example in the abovementioned document by Hamann et al.

Suitable and preferred ethylenically unsaturated monomers which can be used in step (4) of the process of the invention have already been mentioned above in relation to step (1) of the process of the invention.

It is particularly preferable in said embodiment of step (4) of the process of the invention to use a mixture made of at least one functionalized vegetable oil and of at least one ethylenically unsaturated monomer selected from the group consisting of styrene, α-methylstyrene, para-methylstyrene, 1,1-diphenylethylene, para-tert-butylstyrene, vinyltoluene, acrylic acid, methacrylic acid, acrylic ester, methacrylic ester, acrylonitrile, methacrylonitrile, and mixtures thereof.

In said embodiment of step (4), a copolymer is formed from the at least one vegetable oil and from the at least one ethylenically unsaturated monomer. In the invention, the at least one functionalized vegetable oil here preferably polymerizes in the Diels-Alder reaction described above. The at least one ethylenically unsaturated monomer present polymerizes with itself, with the at least one vegetable oil, and/or with previously formed Diels-Alder products, preferably in a free-radical polymerization reaction.

In the invention, it is preferable here that the free radicals necessary for this purpose do not pass into the reaction mixture by virtue of free-radical initiators which are known to the person skilled in the art and which have to be added externally, but instead that said radicals are formed from the monomers present under the temperatures prevailing in the invention, i.e. thermally.

To this end, the at least one ethylenically unsaturated monomer is added to the at least one functionalized vegetable oil, generally in an amount in which it is also intended to be present in the polymeric material that forms the particle. By way of example, from 5 to 60% by weight of at least one ethylenically unsaturated monomer are added, preferably from 15 to 50% by weight, for polymerization together with the at least one functionalized vegetable oil under the conditions prevailing in step (4) of the process of the invention.

The Diels-Alder reaction in the presence of the abovementioned monomers therefore preferably gives a polymeric material which has been formed by a Diels-Alder reaction of the at least one functionalized vegetable oil and which simultaneously comprises structural units formed from the above-mentioned monomers.

In one preferred embodiment, the polymeric material obtained in step (4) of the process of the invention, and based on at least one functionalized vegetable oil and optionally on at least one ethylenically unsaturated monomer, takes the form of viscous oil.

In one preferred embodiment of the present invention, the at least one thermoplastic polymer and, respectively, ethylenically unsaturated monomers of which the thermoplastic polymer optionally present in the shell of the particles is composed are added in step (4), so that the particles comprising a polymeric material based on at least one functionalized vegetable oil as core and comprising a shell made of at least one thermoplastic polymer form in step (4).

As far as the thermoplastic polymer and, respectively, the corresponding monomers are concerned, where this/these is/are present in the shell of the particles, the statements made above in relation to the thermoplastic molding composition of the invention are applicable.

In one preferred embodiment, the amount added of the thermoplastic polymer and, respectively, the corresponding monomers, where this/these is/are present in the shell of the particles, is by way of example from 3 to 50% by weight, preferably from 5 to 20% by weight, based in each case on the entirety of the starting materials in step (4).

Step (5):

Step (5) of the process of the invention comprises the addition of the at least one thermoplastic polymer (component B) to the functionalized polymerized vegetable oil or, respectively, copolymer of vegetable oil and at least one ethylenically unsaturated monomer, from step (2) or (4), in order to obtain a mixture.

In another possible embodiment of the process of the invention, step (5) can be carried out entirely or to some extent before step (1) or, respectively, (3) depending on embodiment. However, it is preferable that step (5) is carried out after step (2) or step (4).

Step (5) of the process of the invention comprises the addition of the matrix material which is present in the thermoplastic molding composition of the invention to the functionalized polymers obtained from step (2) or (4).

Suitable and preferred thermoplastic polymers which are added in step (5) have been specified above in relation to component (B).

The thermoplastic polymer which is added in step (5) of the invention forms what is known as the "matrix" of the thermoplastic molding composition.

In step (5) of the invention it is generally possible to admix any of the suitable thermoplastic polymers known to the person skilled in the art.

It is preferable in step (5) to use at least one thermoplastic polymer which is compatible with the at least one thermoplastic polymer which is present in the optionally present shell of the particles.

For the purposes of the present invention, "compatible" means that good interfacial adhesion is achieved, thus ensuring the mechanical coupling of the vegetable oil particles. It is therefore moreover intended that no incompatibility reactions occur between the two thermoplastics, examples being decomposition, demixing, chemical reactions, discoloration effects, or adverse effects on the mechanical properties of the thermoplastic molding composition of the present invention.

Suitable thermoplastic polymers are preferably those selected from the group consisting of copolymers of at least one vinylic, aromatic monomer and optionally of at least one α,β-unsaturated monocarboxylic acid or from the corresponding nitrile, an example being polystyrene (PS) or styrene-acrylonitrile (SAN). Other suitable thermoplastic polymers are those selected from the group consisting of polycarbonates (PC), polyurethanes (PU), polyamides (PA), polyesters, such as polyethylene terephthalates (PET) or polybutylene terephthalates (PBT), polyether ether ketones (PEEK), polyvinyl chlorides (PVC), polyurethanes (PU), polyoxymethylenes (POM), polyether sulfones (PES), poly-n-butyl methacrylates (PBMA), polymethyl methacrylates (PMMA), polyimides, and biodegradable homo- and copolymers, such as polylactides or polybutyrate.

In one preferred embodiment, the at least one thermoplastic polymer admixed in step (5) is one selected from the group consisting of copolymers of at least one vinylic, aromatic monomer and optionally of at least one α,β-unsaturated monocarboxylic acid or from the corresponding nitrile, an example being polystyrene (PS) or styrene-acrylonitrile (SAN). Other suitable thermoplastic polymers are those selected from the group consisting of polycarbonates (PC), polyurethanes (PU), polyesters, such as polyethylene terephthalates (PET) or polybutylene terephthalates (PBT), polyvinyl chlorides (PVC), polyurethanes (PU), polyoxymethylenes (POM), polymethyl methacrylates (PMMA) and biodegradable homo- and copolymers, such as polylactides or polybutyrate.

Processes for producing polystyrene, and for producing copolymers of styrene and acrylonitrile, have been explained above.

Polycarbonates are polymers which formally can be obtained via reaction of carbonic acid and compounds having at least two hydroxy functions. By way of example, they are accessible via reaction of the corresponding alcohols with phosgene or carbonic diesters in polycondensation and transesterification reactions.

Polyesters suitable for the process of the invention (step (5)) are preferably those selected from the group consisting of polyethylene terephthalate, polybutylene terephthalate, polytrimethylene terephthalate, and blends thereof. Polyesters can be obtained via reaction of diols with dicarboxylic acids or of hydroxycarboxylic acids.

Polyurethanes are copolymers which are obtained via polyaddition of compounds having at least two hydroxy functions and compounds which have at least two isocyanate groups. Examples of polyurethanes which can be used in the invention are those produced from polyester- and/or polyetherdiols and, for example, from toluene 2,4- or 2,6-diisocyanate, methylenedi(phenyl 4,4'-isocyanate), and hexamethylene diisocyanate. Linear or branched polyurethanes can be used.

In one preferred embodiment of the thermoplastic molding composition of the invention, step (5) uses at least one biodegradable polymer. Examples of biodegradable polymers are known to the person skilled in the art, an example being polylactides or polybutyrate.

Polylactides, which are also called polylactic acids, occur in the optically active D- or L-form, because of the asymmetric carbon atom. Polylactides that can be used in the invention can be produced by any of the processes known to the person skilled in the art.

Polylactides are accessible by way of example via the ionic polymerization of lactide, a cyclic combination of two lactic acid molecules. Polylactide is formed in a ring-opening polymerization reaction using temperatures from 140 to 180° C., and also exposure to catalytic tin compounds such as tin oxide. Lactide itself can be produced by fermenting molasses or by fermenting glucose with the aid of various bacteria. It is also possible to produce polylactides that are pure and that have high molecular weight via polycondensation directly from lactic acid.

Step (5) can also use, with preference for styrene polymers, a mixture of the abovementioned thermoplastics with one another or a mixture of the abovementioned thermoplastics with one another with what are known as tougheners, preferably those selected from the group consisting of SBS copolymers, where this is preferred for styrene polymers; for styrene copolymers and polyesters it is possible by way of example to use a mixture of aromatic and aliphatic esters based on poly-epsilon-caprolactone and 1,4-butanediol.

The amounts present of these additions are generally those known to the person skilled in the art to be suitable.

In one preferred embodiment, if the shell of the particle (component A) comprises polystyrene, step (5) likewise uses polystyrene, if appropriate in a mixture with a SBS copolymer. In another preferred embodiment, if the shell of the particle (component A) comprises styrene-acrylonitrile, step (5) likewise uses styrene-acrylonitrile, polyester, polyurethane, or polylactide, optionally in a mixture with the abovementioned SBS copolymers, soft polyurethanes, or polyesters.

The amount added in of the at least one thermoplastic polymer in step (5) is from 20 to 80% by weight. The amount of thermoplastic component admixed varies according to whether a stiff or more elastic product is to be obtained, being from 50 to 80% by weight for stiff products and from 20 to 49% by weight, particularly preferably from 25 to 40% by weight, for more elastic, flexible products, based in each case on the total weight of the thermoplastic molding composition.

The mixing in step (5) of the process of the invention can take place by any of the processes known to the person skilled in the art, for example in an extruder, kneader, LIST reactor, or static melt mixer.

Step (5) of the process of the invention can take place at any temperature that appears to the person skilled in the art to be suitable, preferably at a temperature at which both the functionalized polymer from step (2) or (4) and the matrix material are miscible, for example from 120 to 320° C., preferably from 180 to 280° C.

In one preferred embodiment, the mixing in step (5) continues until adequate mixing of the individual components has been achieved, for example for a few minutes.

Step (6):

Step (6) of the process of the invention comprises the crosslinking of the mixture from step (5) via addition of at least one reagent which reacts with the functional groups that were introduced by step (2) or (3), in order to obtain the thermoplastic molding composition.

The functional groups introduced into the at least one vegetable oil or, respectively, the abovementioned polymer, in particular hydroxy groups, carboxylic acid groups, carboxylic ester groups, and/or carboxylic anhydride groups, can be reacted with appropriate reagents in order to achieve crosslinking by way of said functional groups. One preferred embodiment uses reagents which have at least two functional groups which can react with the functional group in the vegetable oil or, respectively, the polymer, and the functionalized polymer is therefore crosslinked via reaction with said reagents.

If the functional groups in the vegetable oil (co)polymer comprise cyclic anhydride groups, examples of suitable crosslinking reagents are compounds selected from the group consisting of compounds comprising at least two OH, $NH_2$, or NHR functions, particular preference being given to diols, such as glycol or 1,4-butanediol, polyols, such as glycerol and pentaerythritol, diamines, such as hexamethylenediamine, aminoalcohols, such as ethanolamine or N-methylethanolamine, and mixtures thereof.

If hydroxy groups are present as functional groups in the vegetable oil (co)polymer, suitable reagents for the crosslinking reaction are by way of example compounds selected from the group consisting of compounds comprising at least two isocyanate functions, epoxy functions, carboxylic anhydride functions, and/or carboxylic acid function, particular preference being given to hexamethylene diisocyanate, tolylene diisocyanate, methylenedicyclohexyl diisocyanate, isophorone diisocyanate, the glycidyl ether product class (Araldites), products from double adduct formation using maleic anhydride on olefins, and of single and/or double adduct formation per double bond using maleic anhydride on dienes or oligoenes, and mixtures thereof.

If the reagent used comprises a compound which comprises at least two hydroxy functions, ester functions are formed in the polymeric material having the carboxylic acid functions preferably present. If the reagent used comprises a compound which comprises at least two amine functions, amide functions are formed in the polymeric material having the carboxylic acid functions preferably present. If the reagent used comprises a compound which comprises at least one hydroxy function and at least one amine function, ester functions and amide functions are formed in the polymeric material having the carboxylic acid functions preferably present.

The degree of crosslinking of the polymers based on crosslinked vegetable oil can be determined by rheological methods or by measuring the degree of swelling. These methods are known to a person skilled in the art.

For the crosslinking reaction in step (6), the polymeric material obtained in step (5) is reacted in reactions known to the person skilled in the art with reagents which have at least two functional groups which can react with the functional group present in the polymer, preferably with a carboxylic acid function, in order to achieve crosslinking of the functionalized, polymeric material.

Suitable reagents have been mentioned above. The amount of these added in step (6) is generally around 100 mol %, based on the functional groups comprised within the vegetable oil (co)polymer.

The crosslinking reaction preferably takes place via transesterification, transamidation, esterification, urethane-formation, and/or amidation reactions. Suitable process conditions with respect to temperature, pressure, reactors, catalysts, etc. are known to the person skilled in the art.

In one preferred embodiment, the crosslinking reaction in step (6) of the process of the invention is carried out with exposure to a high level of shear action. Processes and apparatuses that allow exposure of a reaction mixture to a high level of shear energy are known to the person skilled in the art, examples being kneaders, such as twin- and multiscrew kneaders, extruders, and LIST reactors. The level of shear energy exerted in the process of the invention is preferably sufficiently high as to give a suitable particle size distribution. Preference is given to particles with an average size of from 200 nm to 0.1 mm, preferably from 300 nm to 10 μm.

Step (6) of the process of the invention gives a crosslinked thermoplastic molding composition.

In the process of the invention it is preferable that the optionally present components, to the extent that they are present, are added at particular locations within the process.

It is preferable that component (C), if present, is added prior to the crosslinking reaction and/or prior to or after addition of the thermoplastic.

It is preferable that component (D), if it is of mineral type, and if it is present, is added prior to or after addition of the thermoplastic, and in the preferred case of wood flour or cork flour, if it is present, is added after the crosslinking reaction.

It is preferable that component (E), if present, is added after the crosslinking reaction.

The thermoplastic molding composition of the invention has particularly advantageous mechanical properties, for example high stiffness, high toughness, high scratch resistance, advantageous tribological properties, such as low friction resistance, low abrasion, and high durability.

The thermoplastic molding composition of the invention can therefore be used in any of the applications in which said particularly advantageous mechanical properties are demanded, for example in construction materials, such as floorcoverings, foils, window frames, insulation materials and packaging materials, for housings of apparatuses, for parts of housings, in the automobile sector, for outdoor applications, or in the form of uncoated plastics surfaces.

The present invention also provides the use of the thermoplastic molding composition of the invention in construction materials, floorcoverings, external cladding of houses, roof coverings, foils, window frames, insulation materials and packaging materials, for housings of apparatuses, e.g. in the electrical or electronics sector, for parts of housings, e.g. in the electrical or electronics sector, in toys, for external applications, for outdoor use, in the sports and automobile sector, for bicycles and motorized bicycles, or as uncoated plastics surfaces.

The present invention also provides construction material, foil, window frame, insulation material or packaging material, a housing of apparatus, a part of a housing, an item of sports equipment, a toy, a bicycle or motorized bicycle, or an uncoated plastics surface, comprising a thermoplastic molding composition of the invention. In one particularly preferred embodiment, the items mentioned consist of the thermoplastic molding composition of the invention.

EXAMPLES

A description is provided below of respectively two experiments based on PS and on SAN. Table 1 collates the variations for the experiments.

TABLE 1

| No. | Maleic anhydride, based on stand oil [%] | Shell | Shell, based on product [%] | Matrix polymer, MP | MP, based on product [%] | Cross-linking agent |
|---|---|---|---|---|---|---|
| 1 | 6.5 | SBS copolymer | 4.4 | PS | 40 | Pentaerythritol |
| 2 | 6.5 | SBS copolymer | 10 | PS | 40 | 1,4-Butanediol |
| 3 | 6.5 | SAN-grafted BUNA | 10 | SAN | 40 | Pentaerythritol |
| 4 | 6.5 | SAN-grafted BUNA | 20 | SAN | 40 | Pentaerythritol |

Maleation: The amount of maleic anhydride used, based on linseed oil, is 10% by weight. Conversion is assumed to be 65%.
Crosslinking: The calculation for the crosslinking agent is based on 65% conversion in the maleation reaction.
Pentaerythritol (4-OH): ¼ equimolar maleic anhydride, 1,4-butanediol (2-OH) ½ equimolar maleic anhydride BUNA-SAN: BUNA 565 SIC with grafted-on styrene(76)/acrylonitrile(24). The experiments use only the soluble fractions. The grafted rubber comprises about 30% by weight of free SAN copolymer, which is counted as part of the matrix.
Rotation rate: The rotation rate of the List reactor is based on the gearbox and is at most 3000 rpm. Conversion calculations give a rotation rate of 332 rpm for the cleaning shaft and 83 rpm for the agitator shaft.
Apparatus: Conical tank
  9.8 liter conical tank (K173-4)
  Triangular anchor stirrer
  HT60 high-temperature thermostat (Julabo) with water-cooling
  $N_2$ inertization, exhaust gas line
List reactor:
  AP1 Conti 1.2 liter twin-shaft kneading reactor
  Cleaning shaft 0-332 rpm
  Agitator shaft 0-83 rpm
  Motor rotation rate 0-3000 rpm
  4 filler necks with Camlock couplings
  HT60 high-temperature thermostat (Julabo)
  $N_2$ inertization (by way of Camlock coupling)
  Exhaust gas line (by way of Camlock coupling)
  Control equipment
Experimental Method:
1. Stand Oil Synthesis (Step (1)):
  4000 g of linseed oil are stirred for 27 h at 280° C. in the conical tank; no crosslinked fractions form during said period here, and the resultant stand oil retains good room-temperature flowability. The stand oil serves as starting material for the experiments numbered 1 to 4.
  The gas space is inertized with passage of nitrogen at a low flow rate, and this removes some of the free fatty acids produced by cleavage. The stand oil synthesis is continued until the stand oil crosslinks in the List reactor, with reduction of the reaction time within the experimental series from 24 to 15 hours, in order to minimize the extent of cleavage reactions.
2. Maleation (Step (2)):
  The appropriate compatibilizer (shell) and maleic anhydride are added uniformly by way of the 4 filler necks. The List reactor is sealed with the couplings and flushed with nitrogen. Prior to the heating process, nitrogen line and exhaust gas line are closed, to avoid expelling sublimed maleic anhydride. The maleation reaction is operated for 12 hours at 210° C. with a rotation rate of 300 rpm (motor rotation rate), and no pressure increase is observed. Unreacted maleic anhydride is expelled at 220° C. by passage of nitrogen.
3. Mixing with Matrix Polymer (Step (5)):
  The corresponding matrix polymer is charged uniformly to the List reactor at from 120 to 150° C. with a countercurrent of nitrogen. To achieve this, Camlock couplings with nitrogen connection and exhaust gas connection can be changed over flexibly at the 4 filler necks. The material is compounded for 0.5 hour at 240° C. at a rotation rate of 300 rpm. The direction of rotation of the two contrarotating shafts is changed over regularly, in order to counteract the conveying effect.
4. Crosslinking (Step (6)):
  The appropriate crosslinking agent is added by way of the 4 filler necks at 240° C., and the reactor is heated to 280° C.

The invention claimed is:
1. A thermoplastic molding composition comprising:
  (A) particles made of nonoxidatively polymerized vegetable oil which has been crosslinked by way of func- tional groups selected from carboxylic anhydride group and hydroxy group, and at least one ethylenically unsaturated monomer; and (B) at least one thermoplastic polymer.

2. The thermoplastic molding composition of claim 1 further comprising:

(C) at least one resin.

3. The thermoplastic molding composition of claim 1 further comprising:

(D) at least one filler.

4. The thermoplastic molding composition of claim 1 further comprising:

(E) additives.

5. The thermoplastic molding composition of claim 1 further comprising two or more of the following:

(C) at least one resin;
(D) at least one filler; and
(E) additives.

6. The molding composition according to claim 2, wherein the at least one resin (C) is present in the particles (A).

7. The molding composition according to claim 1, wherein the vegetable oil is selected from the group consisting of: linseed oil, perilla oil, tung oil, oiticica oil, fish oils, safflower oil, sunflower oil, soybean oil, cottonseed oil, and mixtures thereof.

8. A process for producing the thermoplastic molding composition of claim 1, said process comprising:

(1) nonoxidative polymerization of at least one vegetable oil, in the presence of at least one ethylenically unsaturated monomer, in order to obtain a copolymer of vegetable oil and of at least one ethylenically unsaturated monomer;

(2) introducing functional groups, selected from carboxylic anhydride group and hydroxy group, into the copolymer of vegetable oil and of at least one ethylenically unsaturated monomer from step (1), in order to obtain a functionalized copolymer of vegetable oil and of at least one ethylenically unsaturated monomer;

(5) adding at least one thermoplastic polymer to the copolymer of vegetable oil and of at least one ethylenically unsaturated monomer, from step (2), in order to obtain a mixture, and (6) crosslinking the mixture from step (5) by adding at least one reagent which reacts with the functional groups introduced in step (2), in order to obtain the thermoplastic molding composition.

9. The process according to claim 8, wherein the polymerization of the vegetable oil in step (1) takes place by a Diels-Alder reaction.

10. A construction material, foil, window frame, insulation material or packaging material, a housing of apparatus, a part of a housing, an item of sports equipment, a toy, a bicycle or motorized bicycle, or an uncoated plastics surface, comprising the thermoplastic molding composition according to claim 8.

11. The thermoplastic molding composition of claim 1, wherein the nonoxidative polymerization is by a Diels-Alder reaction.

12. The thermoplastic molding composition of claim 1, wherein the nonoxidative polymerization is by an intermolecular Diels-Alder reaction.

13. A process for producing the thermoplastic molding composition of claim 1, said process comprising:

(3) introducing functional groups, selected from carboxylic anhydride group and hydroxy group, into at least one vegetable oil, in order to obtain a functionalized vegetable oil;

(4) nonoxidative polymerization of the functionalized vegetable oil from step (3), in the presence of at least one ethylenically unsaturated monomer, in order to obtain a copolymer of vegetable oil and of at least one ethylenically unsaturated monomer;

(5) adding at least one thermoplastic polymer to the copolymer of vegetable oil and of at least one ethylenically unsaturated monomer, from step (4), in order to obtain a mixture; and (6) crosslinking the mixture from step (5) by adding at least one reagent which reacts with the functional groups introduced in step (3), in order to obtain the thermoplastic molding composition.

14. The process according to claim 13, wherein the polymerization of the vegetable oil in step (4) takes place by a Diels-Alder reaction.

* * * * *